United States Patent [19]

Sundseth

[11] Patent Number: 5,433,564
[45] Date of Patent: Jul. 18, 1995

[54] CARGO LATCH

[75] Inventor: Jarl Sundseth, Neuhaus, Germany

[73] Assignee: Electro Pneumatic International GmbH, Germany

[21] Appl. No.: 98,473

[22] Filed: Jul. 27, 1993

[30] Foreign Application Priority Data

Jul. 27, 1992 [DE] Germany ............ 42 24 820.5

[51] Int. Cl.$^6$ ........................................ B60P 1/64
[52] U.S. Cl. ............................... 410/77; 410/79
[58] Field of Search ........ 292/44, DIG. 44, DIG. 49, 292/DIG. 53, 56; 410/77, 79

[56] References Cited

U.S. PATENT DOCUMENTS

| | | | |
|---|---|---|---|
| 3,210,038 | 10/1965 | Bader et al. | 410/77 |
| 3,262,588 | 7/1966 | Davidson | 410/79 X |
| 3,377,040 | 4/1968 | Hansen | 410/79 |
| 4,089,275 | 5/1978 | Pelletier | 410/79 |
| 4,121,789 | 10/1978 | Lent et al. | |
| 4,144,821 | 3/1979 | Lang | |

FOREIGN PATENT DOCUMENTS 0304527 11/1987 European Pat. Off. .
2374249 8/1978 France .................. 410/79

Primary Examiner—Rodney M. Lindsey
Attorney, Agent, or Firm—Howard & Howard

[57] ABSTRACT

Conventionally, a container is secured in the cargo hold of an aircraft by a latch comprising a frame having a floor part to which are attached two upwardly extending side parts. At least one latch-arm is mounted on an axle set between the side parts so that it can rotate from a lower, inoperative position into an upright, locking position. Restraining means are used to fasten the latch to a floor of the cargo hold. The present invention proposes the provision of at least one resiliently deformable section in the floor part of the frame so that in use when a force is applied to the latch-arm, the side parts of the frame can move relative to the floor part as the floor part is deformed. A latch of this kind is intended to ensure increased operational reliability with no increase in weight over a conventional latch.

7 Claims, 1 Drawing Sheet

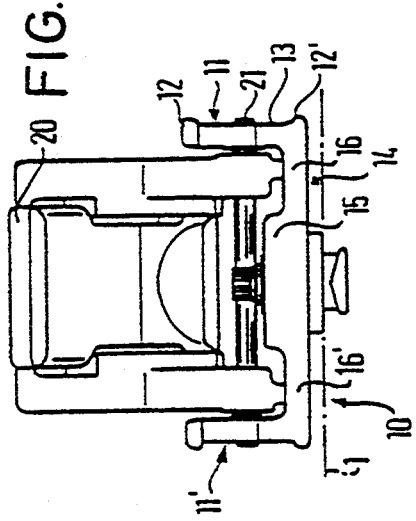
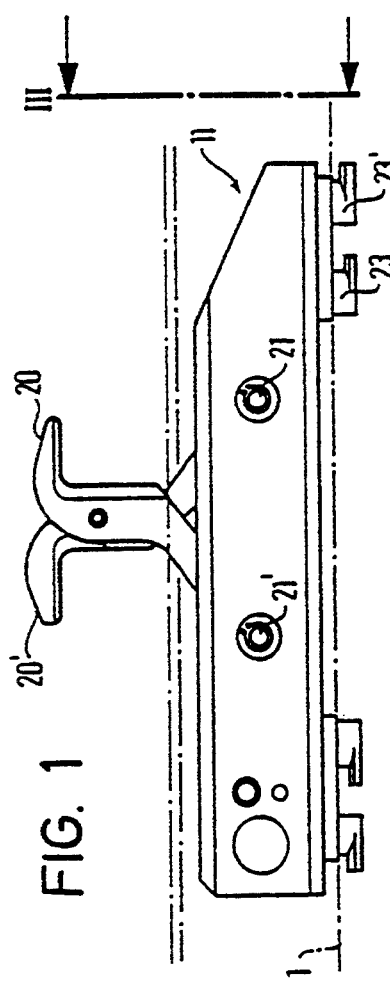
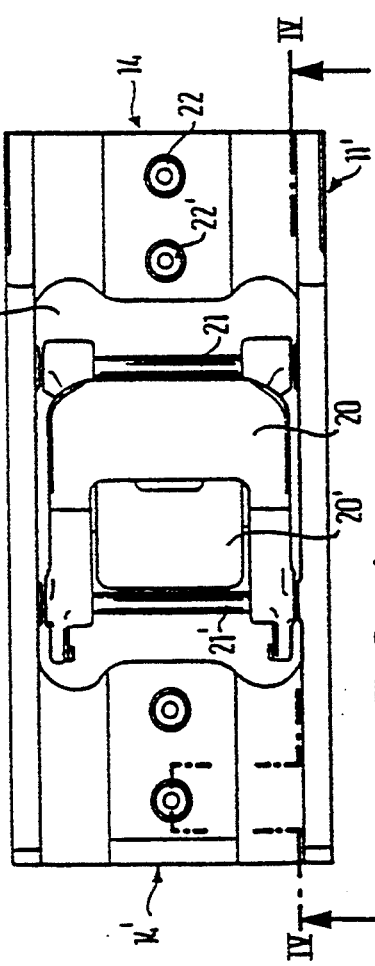
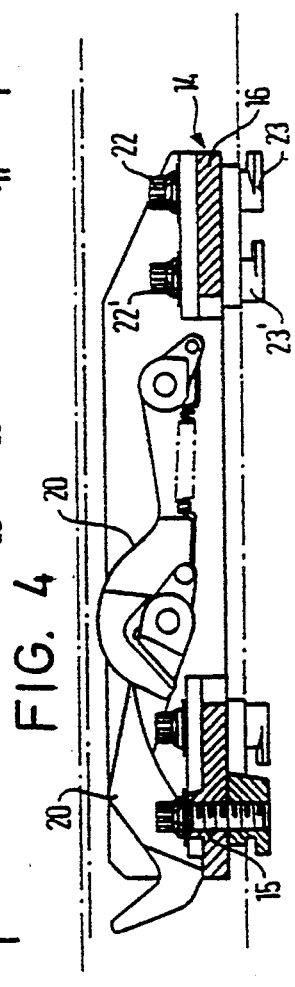

CARGO LATCH

FIELD OF THE INVENTION

The present invention relates to a cargo latch for use in securing a container in the cargo hold of an aircraft.

DESCRIPTION OF THE PRIOR ART

Conventionally, containers are fixed to the floor of the cargo compartment by latches comprising hooks which can be collapsed so that the cargo hold, which is usually accessible from only one side, can be gradually filled. During the flight and especially during take-off and landing, the latches are subjected to impacts of various kinds so that a high degree of reliability is required.

However, this reliability cannot be achieved by making the latches massive in construction because then they would weigh too much.

In a conventional latch, side and floor parts are constructed separately and held together by screw connections.

The object of the present invention is to provide a latch which has an increased operational reliability over a conventional latch without increasing its weight.

SUMMARY OF THE INVENTION

According to the present invention there is provided a latch for securing a container in the cargo hold of an aircraft comprising a frame defining a floor part and two upwardly projecting side parts, at least one latch-arm rotatable mounted between the side parts so that the latch-arm can be rotated from a lower, inoperative position into an upright, locking position, restraining means by means of which the floor part can be fixed to a floor of a cargo hold, and wherein the improvement comprises the provision of at least one resiliently deformable section in the floor part of the frame so that when a force is applied to said latch-arm, the side parts of the frame can move relative to the floor part as the floor part is deformed.

Because impacts are absorbed or attenuated by the resilient deformability the floor part, the latch can be designed to be weaker in terms of both the kind of material used and its thickness than conventional latches.

Preferably, the floor part comprises a strengthened middle section, by which it is screwed to the floor of the cargo hold by means of the restraining means. Between the middle section and the side parts, the floor part comprises lateral sections that are thinner than the middle section and hence constitute resiliently deformable zones. Here it is advantageous for the restraining means or the strengthened middle section to be constructed in such a way that the lateral sections and hence the side parts can move freely, both upward away from the floor and downward toward the floor. This arrangement improves the absorption of impacts from various directions.

Preferably, two floor parts separated from one another by an aperture are provided, with a latch-arm or two latch-arms mounted between them. With this arrangement, when an impact is applied to the latch-arm in the plane of rotation and horizontally, the side parts can tilt in a vertical plane, because one floor part is bowed upward and the other floor part downward. At the same time, the arrangement avoids torsional loading of the lateral sections, which could produce very high tensile stresses in the material and thus easily cause fracture.

The side parts are made as stiff as possible, so that the deformation is substantially restricted to the floor part. Here it is advantageous for the side parts to be provided at their upper and/or lower edges with reinforcing rims that are thicker than a middle region of the side parts. The resulting element, which is of substantially channel section, is very rigid with respect to moments of flexion about an axis perpendicular to the surface. The thickened rims preferably extend outward beyond the (flat) middle region, so as to leave as much clearance as possible for the latch-arms between the two side parts. Alternatively, the axles on which the latch-arms are mounted can be attached to the side parts by securing elements apposed to the flat middle region of the side parts, in which case there are no parts that project beyond the reinforcing rims. Here stability is achieved with a great saving in material and hence in weight. The frame is preferably manufactured integrally in one piece, so that both the assembly costs and the weak places formed by the connections between the side parts and the floor part are minimized. It is especially suitable to manufacture the frame as an extrusion or from an extrusion-molded profile, which subsequently requires only slight machining to be given its final shape.

BRIEF DESCRIPTION OF THE DRAWINGS

An embodiment of the present invention will now be described by way of example with reference to accompanying drawings, in which:

FIG. 1 is a side view of a latch according the the invention when in an operational position;

FIG. 2 is a plan view of the latch shown in FIG. 1;

FIG. 3 is a cross-section along the line III—III in FIG. 1; and

FIG. 4 is a partial cross-sectional view along the line IV—IV in FIG. 2 but when the latch is in a collapsed position.

DESCRIPTION OF A PREFERRED EMBODIMENT

The latch shown in the drawings comprises a frame 10 having two side parts 11, 11' and two floor parts 14, 14', the latter being separated from one another by an aperture or space 17 and integrally joined to the side parts 11, 11' at the ends of the side parts.

Each of the two floor parts 14, 14' comprises a middle section 15 and two lateral sections 16, 16' that are thinner than the middle section 15.

In the middle section 15 are apertures through which restraining means in the form of attachment bolts 22, 22' can be screwed into shoes or clamping means 23, 23' that can be hooked into rails on the floor of the cargo hold. As shown in the partially sectioned drawing of FIG. 4, these shoes 23, 23' are so constructed that they also serve as spacers or feet between the floor parts 14, 14' and the floor 1 of the cargo hold. The floor parts 14, 14' thereby stand free above the floor of the cargo compartment.

The side parts 11, 11' are formed as integral, vertically upward-directed parts of the lateral sections 16, 16'. Each side part 11, 11' comprises a flat middle region 13 plus an upper and a lower strengthened rim 12 and 12', respectively. The strengthened rims 12, 12' form rounded ridges extending outward beyond the outer surface of the middle region 13.

Between the side parts 11, 11' are positioned latch-arms 20, 20' in the form of hooks of conventional design. These latch-arms 20, 20' are mounted rotatably on axles 21, 21' that extend through apertures in the side parts 11, 11' and are fixed by spring rings (shown in FIG. 1) outside the side parts 11, 11'. The axles 21, 21' are dimensioned such that they do not project outward beyond the rounded reinforcing rims 12, 12'.

When a container (not shown) is located so that its lower edge is locked beneath the latch-arm 20 shown in FIG. 1 and the container is shaken up and down, for example during flight through turbulence, the vibratory impulses are transferred through the axle 21' to the side parts 11, 11'. These, because of their reinforcing rims 12, 12', can be regarded as rigid bodies with respect to such forces (directions of force). The lateral sections 16, 16' can however move slightly up and down with respect to the middle section 15, so that there is no direct transfer of force between the latch-arm 20 and the floor 1 of the cargo hold. Therefore all parts of the latch are protected from excessively sharp and material-stressing impulses.

When a force acts horizontally on the latch-arm 20, that is towards the left in FIG. 1, torque is generated in a counterclockwise direction about the axle 21'. In this case, the side parts 11, 11' are tilted (counterclockwise in FIG. 1). This tilt is accompanied by flexure of the lateral sections 16, 16' of the floor parts so that the floor parts are bowed, upward in one case (the righthand floor part 14 in FIGS. 1 and 2) and downward in the other (the lefthand floor part 14' in FIGS. 1 and 2). Here again, the result is to attenuate the effects of an imposed force.

What is claimed is:

1. A latch for securing a container in the cargo hold of an aircraft comprising
   a frame defining a floor part and two upwardly projecting side parts,
   at least one latch-arm rotatably mounted between the side parts so that the latch-arm can be rotated from a lower, inoperative position into an upright, locking position,
   restraining means by means of which the floor part can be fixed to a floor of a cargo hold,
   and wherein the improvement comprises the provision of at least one resiliently deformable section in the floor part of the frame so that in use when a force is applied to said latch-arm, the side parts of the frame can move relative to the floor part as the floor part is deformed, and
   wherein the floor part is provided with a strengthened middle section to which the restraining means are attached, and
   wherein two of said resiliently deformable sections are provided laterally extending from said middle sections to the side parts, said resiliently deformable sections being made uniformly thinner than the middle section to enable them to flex.

2. A latch as claimed in claim 1, wherein said frame is manufactured from an extrusion-molding.

3. A latch as claimed in claim 1, wherein the frame is so constructed and designed to be secured to a floor of a cargo hold that said resiliently deformable sections are substantially freely flexible above said floor after the latch has been attached to said floor.

4. A latch as claimed in claim 1, wherein two said floor parts are provided which define an aperture therebetween.

5. A latch as claimed in claim 1, wherein each of said side parts define upper and lower edges at least one of which is provided with a reinforcing rim and between which is a middle part, each of said reinforcing rims being thicker than its respective middle part so that it extends outward beyond its respective middle part.

6. A latch claimed in claim 1, wherein said frame is manufactured as an integral unit.

7. A latch as claimed in claim 1, wherein said frame comprises an extrusion.

* * * * *